United States Patent Office 3,027,358
Patented Mar. 27, 1962

3,027,358
PROCESS FOR THE PRODUCTION OF COPOLYMERS OF VINYL CHLORIDE AND FUMARIC ACID ESTERS
Hans-Walter Ebersbach and Joseph Heckmaier, Burghausen, Upper Bavaria, Germany, assignors to Wacker-Chemie G.m.b.H., Munich, Germany, a firm of Germany
No Drawing. Filed July 20, 1959, Ser. No. 828,061
Claims priority, application Germany Sept. 24, 1958
7 Claims. (Cl. 260—78.5)

Copolymers of vinyl chloride with esters of ethylene 1,2-dicarboxylic acids such as maleic acid, fumaric acid and itaconic acid have been described previously and processes for their production are known to the art. In the processes heretofore known and described, only the esters of maleic acid gave really satisfactory copolymers with vinyl chloride and these were essentially limited to the esters formed with the lower aliphatic alcohols such as methanol, ethanol and butanol, for example. These short chain lower aliphatic alcohol esters of maleic acid can be copolymerized with vinyl chloride, and also with other polymerizable monomers to form mixed polymers, and the many polymerization procedures well known to the art are usually quite satisfactory. These copolymers differ from the polymers obtained when vinyl chloride alone is polymerized, being distinguished particularly for their greatly improved solubility in many different organic solvents which makes them especially suitable for the preparation of coating compositions. Although these maleic acid ester copolymers are similar to polyvinyl chloride in that they have about the same softening temperature before any softening agents are added, and can also be shaped and molded with the same techniques, they do have the disadvantage that without using any softening agents they possess rather poor impact and shock resistance.

It is, therefore, an important object of this invention to provide a new and novel process for the production of copolymers of vinyl chloride and certain fumaric acid esters which have greatly improved physical resistance to shock and impact and which do not require any softening or plasticizing agents to be incorporated therewith to produce these desirable characteristics.

Other objects of this invention will appear from the following detailed description.

It has now been found that substantially improved copolymers of vinyl chloride with esters of fumaric acid can be obtained which possess greatly increased shock and impact resistance in unplasticized form if vinyl chloride is copolymerized with a fumaric acid ester having the empirical formula $C_nH_{2n-4}O_4$, where $n$ is 14 to 44, in a buffered aqueous medium containing a hydroxyalkyl cellulose, and wherein the mixture of monomers in said reaction medium contains at least 80 mol percent of vinyl chloride and up to 20 mol percent of the fumaric acid ester.

The mechanical properties of the copolymers obtained by the novel process of this invention have been found to be directly related to the alcohol with which the fumaric acid is esterified. Preferably, the alcohol residues should be those of saturtaed, straight chain or branched chain alcohols such that the total number of carbon atoms in both alcohol residues, taken together, will be from 12 to 40, and most advantageously from 16 to 36. It is not necessary that both carboxy groups of the fumaric acid be esterified with the same alcohol or that the copolymer be formed with but a single fumaric acid ester. Mixed esters where two, three or even four different alcohol residues are present may also be employed. It is only necessary to obtain the desired properties in the copolymer with vinyl chloride that the fumaric acid ester or mixed ester fall within the empirical formula given.

While a great many protective colloids are known and have been satisfactorily employed in the suspension polymerization of polymerizable monomers, it has been found in the present process that a suitable product having the desired physical characteristics is obtained only when the protective colloid employed is a hydroxyalkyl cellulose such as hydroxyethyl cellulose. Other protective colloids yield products which when processed into films have a great abundance of those irregularities peculiar to polyvinyl chloride films which are best described by the term "fish eyes." These defects are quite like the descriptive term employed and appear to be formed of polymer nuclei which have a somewhat different index of refraction than the majority of the polymer particles and the defects which emerge due to these differences are readily apparent when the copolymer particles are processed into the form of a film on calender rolls.

The concentration of the protective colloid in the reaction mixture depends partially upon the specific viscosity of the hydroxyalkyl cellulose employed and also upon the operating characteristics of the reaction vessel employed such as, for example, the type of stirrer and the rotational speed at which it is operated. Most advantageously, a protective colloid consisting of hydroxyethyl cellulose is employed and preferably one which in the form of a 5% by weight aqueous solution has a viscosity of 100 to 500 poises at a temperature of 20° C. The concentration of the protective colloid should be no greater than about 0.5% on the weight of the monomers present or about 0.3% on the weight of the aqueous phase. To produce a polymer of a desirably fine particle size the intensity of agitation should be as close to the maximum obtainable with the apparatus employed.

In carrying out the process of the present invention it is quite important to maintain the pH of the aqueous phase between pH 4.5 and 8 and preferably between pH 5.5 and 7.5. It is well known, of course, that during the polymerization of vinyl chloride there is always a certain fraction of the monomer which undergoes hydrolysis and the acid products which are thus formed can cause a marked lowering of the pH. It is of importance to maintain the pH well above 4 since the activity of hydroxyethyl cellulose as a protective colloid for the copolymerization of vinyl chloride with fumaric acid esters is substantially decreased under these conditions, if the pH value is low. Accordingly, a buffer salt such as sodium bicarbonate, a phosphate salt or the like is incorporated in the reaction mixture in order to maintain the desired pH level, as described, during the course of the polymerization reaction.

It is also important that the entire quantity of the monomers in the reaction mixture undergoing copolymerization be charged into the reaction vessel before the polymerization reaction takes place. In the processes previously employed for the production of copolymers of vinyl chloride and fumaric acid, certain predetermined feed rates were utilized but it has now been found in accordance with the present invention that the variation or differential respecting the molecular ratios utilized in the process described, surprisingly enough, appears to be responsible for the excellent mechanical properties which are exhibited by the finished product.

Preferably, the monomer mixture employed should contain from about 1 to 15 mol percent of the fumaric acid ester with the remaining 99 to 85 mol percent of monomer being vinyl chloride.

The catalysts which may be employed to aid the polymerization reaction are those which are commonly utilized in the polymerization of vinyl chloride for the production of polyvinyl chloride, such as the organic peroxides. Di-lauroyl peroxide is particularly suitable.

The copolymers obtained by the process of the present invention can be readily processed into products of various shapes without the use of softening or plasticizing agents. Films, tubes, sheets, deep-drawn hollow bodies, and the like may be formed with no difficulty. The finished articles obtained are quite similar to polyvinyl chloride materials and to certain other copolymers of vinyl chloride in their obstanding shock and impact resistance and are quite free of any brittleness. As the percentage ratio of vinyl chloride and fumaric acid ester is varied within the proportions described above, which is one of the important features of this invention, the character of the copolymers obtained changes also, with monomer mixtures of lower fumaric acid ester content yielding softer and more flexible products.

In order further to illustrate this invention the following examples are given:

Example 1

An enamelled autoclave of 150 liters capacity provided with a stirrer is charged with 60 kg. of de-mineralized water, 2.1 kg. of a 5% by weight aqueous solution of partially acetylated polyvinyl alcohol of medium viscosity having a saponification value of about 200, and 12 g. of sodium bicarbonate. The aqueous phase, after thorough mixing, is covered with an organic phase consisting of a mixture of 4.5 kg. of the di-(2-ethylhexyl) ester of maleic acid with 75 g. of dilauroyl peroxide. The stirring autoclave is sealed, flushed with nitrogen and then, to remove all of the oxygen, is evacuated for about 30 minutes with a suitable vacuum pump. 25.5 kg. of liquid vinyl chloride is then added to the autoclave through a suitable pressure reservoir. The stirrer is then set in motion at a speed of about 100 r.p.m. and the reaction mixture heated to a temperature of 50° C. After a short induction period the polymerization reaction commences and then proceeds with a pressure drop of about 1 atmosphere taking place. A copolymerizate is obtained with medium to fine particle size which may be readily filtered and is then dried. The polymer formed has a K-value of about 65 and a chlorine content of about 48%.

When this copolymer is processed on a calender roll at a temperature of 170° C. to 180° C. with the addition of 1% by weight of a stripping wax and 2% by weight of a stabilizing agent, a film of high clarity is obtained which is substantially entirely free of the film defect usually referred to as "fish eyes." The film has a tear resistance of 545 kg./cm.$^2$ with an increase in length of 5% but shatters or tears under a sudden or sharp blow or the rapid application of a tearing force. The use of polyvinyl alcohol as a protective colloid with a vinyl chloride-maleic acid ester copolymerization produces no adverse affects on the polymer.

Example 2

25 kg. of vinyl chloride and 4.5 kg. of the di-(2-ethylhexyl) ester of fumaric acid are copolymerized in the manner described in Example 1 in which the protective colloid is polyvinyl alcohol. The polymerization product obtained is substantially identical to the copolymer produced in Example 1, but it does contain a grainy fraction of intermediate particle size. However, if this copolymer is processed into a thin film on a calender, the film formed is found to contain innumerable "fish eyes" and as such is completely useless for any commercial application. This clearly illustrates that the behavior of fumaric acid esters and maleic acid esters differs markedly under the same copolymerization reaction conditions.

Example 3

The process described in Example 2 is repeated but in place of the polyvinyl alcohol employed as the protective colloid 4.2 kg. of a 2.5% aqueous solution of methyl cellulose of medium viscosity is employed as the protective colloid. The methyl cellulose employed is that available commercially under the name of "Tylose SL 100." Again, while the copolymer is obtained in the form of fine granular particles, these particles do not undergo complete fusion when processed on a calender into the form of a film and the film obtained has a large number of "fish eyes."

Example 4

The novel process of the present invention, employing the sequence of operations described in Example 1, is employed to effect the polymerization of a mixture of 25.5 kg. of vinyl chloride and 4.5 kg. of the di-(2-ethylhexyl) ester of fumaric acid. 75 g. of dilauroyl peroxide are employed as polymerization initiator and the polymerization is carried out at a temperature of 50° C. with the aqueous phase employed in carrying out this copolymerization consisting of 60 kg. of de-mineralized water, 0.75 kg. of a 5% aqueous solution of a hydroxyethyl cellulose having a viscosity of 300 poises measured at 20° C. and 12 g. of sodium bicarbonate. After the reaction has proceeded for 34 hours a conversion of 95% is effected and the pressure in the vessel falls by about 1 atmosphere. The autoclave is opened and the copolymer formed is isolated in the usual manner. The polymer obtained is granular, of medium particle size distribution and has a K-value of 65. When this copolymer is processed into a film on calender rolls at a temperature of 170° C. to 180° C. after being initially plasticized in a suitable mixing device with 1 part by weight of a stripping wax and 2 parts by weight of a stabilizer for each 100 parts by weight of the polymer, a smooth even film is obtained entirely free of "fish eyes," although the optical clarity of this film is not quite the equal of that of the film obtained in accordance with the process of Example 1. However, the mechanical properties of the film are excellent, the film being highly flexible and quite resistant to splitting on the application of a sudden mechanical force. The tear resistance of the film is 400 kg./cm.$^2$ and when stretched the film elongates 150% before rupturing.

Example 5

Employing the reaction conditions described in Example 4, 27 kg. of vinyl chloride are copolymerized with 3 kg. of the dilauryl ester of fumaric acid employing an aqueous polymerization medium and a temperature of 52° C. The polymerization is effected with the aid of 60 g. of di-lauroyl peroxide as the polymerization initiator with the aqueous polymerization medium being a mixture of 60 kg. of de-mineralized water, 1.5 kg. of a 5% aqueous solution of the hydroxyethyl cellulose described in Example 4, and 18 g. of sodium bicarbonate. After the reaction has proceeded for 37 hours the pressure in the vessel drops about 1 atmosphere and the polymer formed is then separated and worked up in the usual manner as described. 100 parts by weight of the polymer are thoroughly mixed with 1 part by weight of a stripping wax and 2 parts by weight of a stabilizer consisting of the tin compound containing an intermediate sulfur linkage available commercially as "Advastab 17 M." After the mixture is converted into a homogeneous mass in a mixer it is then fed to a calender roll where the desired film of 0.2 mm. in thickness is formed. The film obtained is free of any "fish eyes" and is highly transparent with only slight trace of cloudiness. On application of a sudden mechanical force the film does not split and it exhibits a tear resistance of 410 kg./cm.$^2$ with a total elongation of 100%. The film obtained is exceptionally well suited to the formation of hollow objects of outstanding impact resistance by vacuum forming techniques. The differences in physical properties of the copolymers obtained by the present process are amply illustrated by the examples given above.

We claim:
1. Process for the production of copolymers of vinyl chloride with a dialkyl ester of fumaric acid by suspension polymerization, which comprises forming an aqueous polymerization reaction medium in which the aqueous phase is maintained between pH 4.5 and 8, said medium containing a hydroxyalkyl cellulose as a protective colloid together with from 80 to 99 mol percent of vinyl chloride and 1 to 20 mol percent of a dialkyl ester of fumaric acid having the empirical formula $C_nH_{2n-4}O_4$, wherein $n$ is an integer of from 14 to 44, said hydroxyalkyl cellulose being present in a concentration not greater than 0.5% on the weight of the monomers present and not more than 0.3% on the weight of the aqueous phase, and causing the monomers in said reaction mixture to undergo copolymerization with the aid of organic peroxides by heating the reaction mixture to a polymerization reaction temperature.

2. Process in accordance with claim 1 wherein the protective colloid is hydroxyethyl cellulose.

3. Process in accordance with claim 1 wherein from 85 to 99 mol percent of vinyl chloride and 1 to 15 mol percent of the fumaric acid ester are present in the reaction medium.

4. Process for the production of a copolymer of vinyl chloride with the di-(2-ethylhexyl) ester of fumaric acid by suspension polymerization, which comprises forming an aqueous reaction mixture containing hydroxyethyl cellulose, from 80 to 99 mol percent of vinyl chloride and from 1 to 20 mol percent of said di-(2-ethylhexyl) ester of fumaric acid, said hydroxyethyl cellulose being present in a concentration not greater than 0.5% by weight of the monomers present nor 0.3% by weight of the aqueous phase, and causing said monomers in the reaction mixture to undergo copolymerization with the aid of organic peroxides while maintaining the pH of the aqueous phase between pH 4.5 and 8 by heating the reaction mixture to a polymerization reaction temperature.

5. Process in accordance with claim 4 wherein the hydroxyethyl cellulose has a viscosity of from 100 to 500 poises in a 5% aqueous solution measured at 20° C., and the pH of the aqueous phase is maintained between pH 5.5 and 7.5.

6. Process in accordance with claim 4 wherein the fumaric acid ester employed is dilauryl fumarate.

7. Process in accordance with claim 5 wherein the fumaric acid ester employed is dilauryl fumarate.

References Cited in the file of this patent

UNITED STATES PATENTS

| | | |
|---|---|---|
| 2,194,354 | Crawford et al. | Mar. 19, 1940 |
| 2,470,909 | Baer | May 24, 1949 |
| 2,538,051 | Schick | Jan. 16, 1951 |
| 2,580,277 | Boyd et al. | Dec. 25, 1951 |
| 2,689,836 | Bier | Sept. 21, 1954 |
| 2,823,200 | Longley | Feb. 11, 1958 |